G. L. PEEPLES.
COUPLING FOR ELECTROLIERS.
APPLICATION FILED APR. 16, 1909.

967,548.

Patented Aug. 16, 1910.

Witnesses
L. B. James
C. M. Havill

Inventor
George L. Peeples
By Walter W. Calmore
Attorney

THE NORRIS PETERS CO., WASHINGTON, D. C.

UNITED STATES PATENT OFFICE.

GEORGE L. PEEPLES, OF WASHINGTON, DISTRICT OF COLUMBIA.

COUPLING FOR ELECTROLIERS.

967,548.

Specification of Letters Patent. Patented Aug. 16, 1910.

Application filed April 16, 1909. Serial No. 490,238.

*To all whom it may concern:*

Be it known that I, GEORGE L. PEEPLES, a citizen of the United States, residing at Washington, in the District of Columbia, have invented certain new and useful Improvements in Couplings for Electroliers, of which the following is a specification.

This invention relates to certain new and useful improvements in couplings for electroliers.

The object of the invention is to provide a coupling which, in case the building or service pipe is out of plumb, will permit the fixture to hang perpendicularly without necessitating bending of the pipe or fixture as is the case with the rigid couplings commonly used. This desideratum is obtained by means of a pivot or hinge-joint and bendable lugs or pins as will be fully set forth in the following description.

Figure 1:
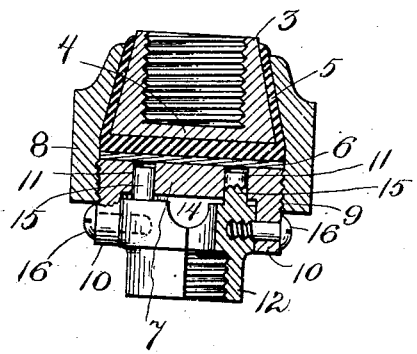
Figure 2:
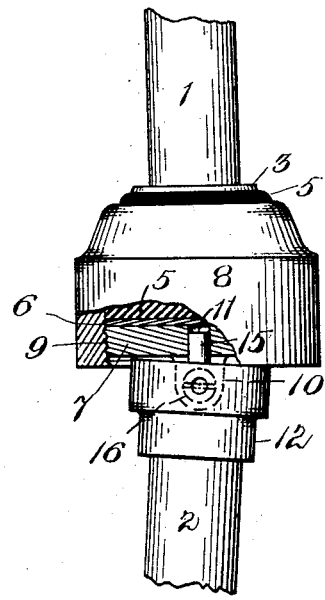

Reference will be had to the accompanying drawings forming a part of this specification and wherein like numerals of reference designate corresponding parts throughout the several views, in which:

Figure 1 is a vertical sectional view, and Fig. 2 a side elevation, portions of the building or service and fixture pipes being shown and parts being broken away in section.

Reference numeral 1 designates the building or service pipe and 2 the fixture pipe. To the building or service pipe is attached, preferably by threading, an upper coupling member 3 with tapering exterior portion and closed bottom portion 4. This coupling member 3 is inclosed within a cup-shaped insulating member 5 beneath which is a brass or other soft metal or composition washer 6 to prevent abrasion of the insulation which is usually mica. A disk 7 is applied against the said washer and is coupled with the upper coupling member by means of a sleeve 8, said sleeve and disk being threaded as indicated by numeral 9. It is customary to screw the fixture pipe directly into a member corresponding to the disk of this invention, in which case it is necessary to bend either the building or service pipe 1 or the fixture pipe 2 in the event the service or building pipe has not been properly installed so that the fixture would hang perpendicularly. To overcome this necessity of bending and thereby possibly damaging or breaking said pipes loose from their anchorage, this invention is devised. The said disk 7 is provided with downwardly extending diametrically oppositely disposed ears or lugs 10 and a plurality of recesses 11. Fitting between the said ears or lugs is a tubular lower coupling member 12 into which the fixture pipe threads. This coupling member 12 is tubular and opposite portions of the upper edge are notched for the reception of the conductor wires as indicated by numeral 14. Extending upwardly from the upper edge of member 12 in line with the ears or lugs 10 are integral pins 15 which extend into said recesses 11 of the disk 7. This lower coupling member 12, which is preferably of brass or bendable material, is pivoted or hinged to said ears or lugs 10 by screws 16 which latter pass through unthreaded openings in said ears or lugs and into threaded recesses in the coupling member 12.

In the course of constructing a building, the service pipe 1 is capped with members 3, 7 and 8, and when the time for the attachment of the fixtures arrives, the coupling member 12 is threaded onto the fixture pipe 2, the screws 16 passed through the lugs and threaded into said coupling member 12, said pins 15 seating in the recesses 11 of the disk 7. Should the service pipe 1 be out of plumb as illustrated in Fig. 2, the fixture is swung on said screws 16 which form a pivot point until the fixture hangs perpendicularly. Instead of the pipes being bent by this plumbing operation, the pins 15 bend and these pins are found to be sufficient to sustain the fixture in proper position against the usual knocks and jars to which fixtures are subjected. However, the pins are assisted in retaining the fixture in proper position by the screws 16 being finally screwed home to clamp the said ears or lugs 10 firmly against the sides of the coupling member 12. The disk being of brass or bendable material, permits the ears to bend or spring to accomplish the clamping action just described, and likewise, the coupling member 12 being of the same material, the pins are permitted to bend without breaking.

Having fully described the invention, what is claimed as new and useful and desired to be secured by Letters Patent is:

1. A fixture coupling, comprising a member adapted to be attached to the service pipe, a member adapted to be attached to the fixture pipe, means pivotally connecting said members, and bendable means on one of said members entering the other member.

2. A fixture coupling, comprising a member adapted to be attached to the service pipe, a member adapted to be attached to the fixture pipe, means pivotally connecting said members, bendable means alined with the pivot points and on one member entering the other member.

3. A fixture coupling, comprising a member adapted to be attached to the service pipe, a member adapted to be attached to the fixture pipe, means pivotally connecting said members, bendable pins on one member in line with the point of pivot, said pins entering recesses in the other member.

4. A fixture coupling, comprising a member adapted to be attached to the service pipe, a member adapted to be attached to the fixture pipe, one of said members being provided with bendable ears, pivots passing through said ears into the other member and adapted to clamp the ears tight against said other member, bendable lugs on one of said members alined with the pivotal point and entering the other member.

In testimony whereof I affix my signature in presence of two witnesses.

GEORGE L. PEEPLES.

Witnesses:
J. D. YOAKLEY,
A. P. SINCELL.